Patented July 10, 1951

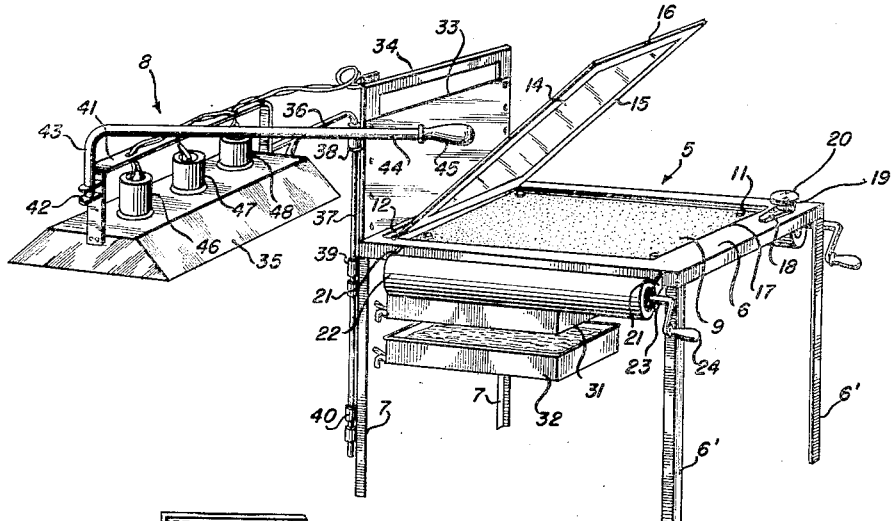

2,559,766

UNITED STATES PATENT OFFICE 2,559,766

PHOTOGRAPHIC CONTACT PRINTING APPARATUS

John E. Griffin, Muskegon, Mich.

Application September 30, 1949, Serial No. 118,954

3 Claims. (Cl. 95—73)

This invention relates to improvements in photographic apparatus, and more particularly to an improved blueprint-developing machine, the primary object of the invention being to provide a simple and inexpensive, manually-operated device of this kind which enables efficient production of satisfactory prints.

Other important objects and advantageous features of the invention will be apparent from the following description and the accompanying drawings, wherein for purposes of illustration herein a specific embodiment of the invention is set forth in detail.

In the drawings:

Figure 1 is a perspective view of the device, with the light assembly moved to inoperative position;

Figure 2 is a top plan view of Figure 1, showing the light assembly in inoperative position in full lines and in operative position in dotted lines, with the developing tanks swung out to accessible positions;

Figure 3 is an enlarged fragmentary vertical section taken on the line 3—3 of Figure 2.

Referring in detail to the drawings, wherein like numerals designate like parts throughout the several views, the illustrated device comprises a frame 5 having a rectangular top 6 having depending front legs 6' and rear legs 7 at the related corners thereof and a light assembly 8 mounted on the frame.

Resting upon the frame top 6 is a rectangular base glass 9 formed in its corners with holes 10 receiving positioning or holding page 11 rising from the top 6. Hinged on the frame top 6 at the rear edge of the base glass 9, as indicated at 12, is the holding glass 14 set in a protective frame 15 in such an arrangement that the holding glass 14 can be swung upwardly away from registered contact with the base glass 9 to enable paper to be placed upon and removed from the base glass 9.

The front edge 16 of the holding glass 14 extends forwardly beyond the front edge 17 of the base glass 9 to facilitate lifting or swinging the holding glass upwardly from its depressed position. For holding the holding glass 14 spaced slightly upwardly from the base glass 9 during feeding of sensitized paper therebetween, a spacer arm 18 carried by a peg 19 journaled in the right-hand front corner of the frame top 6 is provided, the peg having a knurled knob 29 to facilitate moving the arm 18 into and out of place relative to the base glass and holding glass.

Supported horizontally along the left-hand side of the frame top 6 at a slightly lower level by means of bracket 21 is a light-proof, cylindrical magazine 22 in which is journaled a roller 23 having an operating handle 24 on its forward end. The roller 23 contains sensitized paper 25 to be fed across the frame top 6 between the base glass 9 and the holding glass 14 while spaced by the arm 18. The left-hand edges 26 and 27 of the base and holding glasses, respectively, are oppositely beveled, as indicated in Figure 3, to facilitate entry of the sensitized paper therebetween.

Further brackets 21' on the right-hand side of the frame top 6 support the receiving or winding roller 28 having a crank handle 29 on its forward end.

A vertical axle 30 mounted on the right rear frame leg 7 provides pivotal support at the right rear corners of upper and lower rectangular solution tanks 31 and 32 respectively, located beneath the frame top 6, whose use is hereinafter described.

An opaque shield plate 33 rises behind the holding glass 14 and is supported on a vertical rectangular frame member 34 rising from the frame top 6.

The light assembly 8 comprises a horizontally-elongated rectangular reflector 35 having secured to the right-hand end thereof the lateral arm 36 on the upper end of a vertical axle 37 which is supportably journaled on the left-hand rear corner of the frame by means of upper, intermediate and lower bearings 38, 39 and 40, respectively, at such a level that when the reflector 35 is swung over the frame top 6, as shown in dotted lines in Figure 2, the reflector 35 will be spaced above the holding glass 14 at the correct distance.

The light assembly further comprises an inverted U-shaped support 41 secured at its ends to opposite ends of the reflector 35 and having vertically-spaced ears 42 on its left-hand end in which is pivotally mounted the downturned terminal 43 on the rear end of the horizontal handle bar 44, having a hand grip 45 on its forward end, and by means of which the light assembly is swung into and out of operative position.

Extending vertically through openings spaced along the reflector 35 and having their energizing wires 36 extending supportably through openings in the support 41 from left to right in Figure 1, are bases of lamps 46, 47 and 48, consisting of an ultra-violet lamp, a heat lamp and a second ultra-violet ray lamp, respectively.

The tracing or drawing to be reproduced is secured by suitable means (not shown) to the under surface of the holding glass 14. The sensitized paper 25 having been run across the base glass 9 from the magazine 22 onto the collar 28 with the holding glass in depressed position and containing the tracing or drawing to be reproduced, the light assembly 8 is swung into position over the holding glass 14 and the violet lights 46 and 47 are turned on by means of the switches 46' and 47' on the back of the frame member 34 and the exposure is timed.

At the end of this exposure, the light assembly 8 is swung rearwardly out of the way and the print is removed from between the holding glass and base glass and is placed into the upper tank 31 containing potassium chloride or other suitable chemical, and next into washing water in the lower tank 32. With surplus water drained off, the print is returned to position on the base glass 9, which has a drying blotter 49 set into a depression 50.

The holding glass 14 is then brought down to the depressed position and the light assembly moved into position thereover and with the ultra-violet lights 46 and 48 turned off, the heat light 47 is turned on by means of the switch 47' to dry the print. For additional prints, the process described above is repeated. With the use of ammonia vapor, the machine can be used to produce blue-line prints on white paper.

What is claimed is:

1. A photographic machine comprising a generally rectangular frame having a horizontal top, a horizontal base glass mounted on said top on which sensitized paper is adapted to be laid, a holding glass horizontally hinged along the rear of said frame top to swing forwardly and downwardly from an elevated inoperative position to a depressed operative horizontal position in registry with said base glass and sensitized paper thereon, a vertical light shield rising from the rear of said frame top behind said holding glass, and a light assembly comprising a horizontal reflector having light means thereunder, a horizontal arm projecting from said reflector, and means pivoting said arm on the rear of said frame and at one side thereof whereby said reflector can be swung in a horizontal plane parallel to said holding glass from an inoperative position behind said light shield to an operative position over and in registry with said holding glass when said holding glass is in its depressed operative position.

2. A photographic machine comprising a generally rectangular frame having a horizontal top, a horizontal base glass mounted on said top on which sensitized paper is adapted to be laid, a holding glass horizontally hinged along the rear of said frame top to swing forwardly and downwardly from an elevated inoperative position to a depressed operative horizontal position in registry with said base glass and sensitized paper thereon, a vertical light shield rising from the rear of said frame top behind said holding glass, and a light assembly comprising a horizontal reflector having light means thereunder, a horizontal arm projecting from said reflector, and vertical pivot means pivoting said arm on the rear of said frame whereby said reflector can be swung laterally from an inoperative position behind said light shield to an operative position over and in registry with said holding glass in a plane parallel to said holding glass when said holding glass is in its depressed operative position, said arm being pivoted at one side of the rear of said frame whereby said reflector can move laterally with respect to said one side of said frame in being swung into and out of operative position.

3. In a photographic machine, a frame having a horizontal top having a horizontal base glass thereon, a holding glass hinged along the rear of said top behind said base glass to swing forwardly and downwardly from an elevated inoperative position to a depressed operative position upon and in registry with the base glass, a vertical light shield rising from said top along the rear thereof including a frame, and a light assembly comprising a horizontal arm having an end pivoted on a vertical axis on one end of said shield frame at one side of the machine frame, a horizontal light reflector mounted at one end on the opposite end of said arm, and a horizontal handle bar pivotally mounted at one end on a vertical axis on the opposite end of the reflector and having a handle on its opposite end arranged to extend forwardly beyond said shield along one side of the machine frame whereby said reflector can be maintained in a horizontal plane parallel to and spaced above the frame top at a desired distance and swung laterally from a shielded position behind said shield to an operative position over and in registry with said base glass while the base glass is in depressed operative position.

JOHN E. GRIFFIN.

REFERENCES CITED

The following references are of record in the file of this patent:

UNITED STATES PATENTS

| Number | Name | Date |
| --- | --- | --- |
| 1,261,177 | Strong | Apr. 2, 1918 |
| 2,001,062 | Grant | May 14, 1935 |
| 2,129,768 | Huebner | Sept. 13, 1938 |
| 2,366,722 | Gaebel | Jan. 9, 1945 |
| 2,371,594 | Hineline | Mar. 13, 1945 |
| 2,390,497 | Campbell | Dec. 11, 1945 |
| 2,428,333 | Lessler | Sept. 30, 1947 |
| 2,484,048 | Powers et al. | Oct. 11, 1949 |
| 2,512,126 | Zachmann et al. | June 20, 1950 |